United States Patent
Ronnow et al.

(10) Patent No.: US 8,520,469 B2
(45) Date of Patent: Aug. 27, 2013

(54) SENSOR ASSEMBLY HAVING A SEISMIC SENSOR, PRESSURE SENSOR, AND PROCESSOR TO APPLY FIRST AND SECOND DIGITAL FILTERS

(75) Inventors: Daniel Ronnow, Oslo (NO); Qinglin Liu, Oslo (NO); Jon Magnus Soerli, Svelvik (NO); Julian Edward Kragh, Finchingfield (GB); Pascal Edme, Cambridge (GB); Everhard Muyzert, Girton (GB)

(73) Assignee: WesternGeco L.L.C., Houston, TX (US)

( * ) Notice: Subject to any disclaimer, the term of this patent is extended or adjusted under 35 U.S.C. 154(b) by 600 days.

(21) Appl. No.: 12/757,103

(22) Filed: Apr. 9, 2010

(65) Prior Publication Data

US 2011/0085419 A1    Apr. 14, 2011

Related U.S. Application Data

(60) Provisional application No. 61/250,666, filed on Oct. 12, 2009.

(51) Int. Cl.
*G01V 1/00* (2006.01)

(52) U.S. Cl.
USPC .......................................................... 367/43

(58) Field of Classification Search
USPC .................................................... 367/43, 45
See application file for complete search history.

(56) References Cited

U.S. PATENT DOCUMENTS

| | | | |
|---|---|---|---|
| 3,722,751 A | 3/1973 | Bisciglia | |
| 3,934,218 A | 1/1976 | Babb | |
| 4,091,356 A | 5/1978 | Hutchins | |
| 4,134,097 A * | 1/1979 | Cowles | 367/13 |
| 4,163,206 A | 7/1979 | Hall, Jr. | |
| 4,253,164 A | 2/1981 | Hall, Jr. | |
| 4,334,296 A | 6/1982 | Hall, Jr. | |
| 4,520,467 A * | 5/1985 | Berni | 367/24 |
| 4,599,713 A | 7/1986 | Rudaz | |

(Continued)

FOREIGN PATENT DOCUMENTS

| | | |
|---|---|---|
| EP | 0736781 A1 | 9/1996 |
| EP | 1257849 B1 | 11/2002 |

(Continued)

OTHER PUBLICATIONS

Harris, J.M., Nolen-Hoeksema, C., Langan, T., Schaack, M.V., Lazarato, S.K., Rector, J.W., "High-Resoution Crosswell Imaging of a West Texas Carbonate Reservoir: Part-1—Project Summary and Interpretation," Geophysics, 1995, vol. 60, No. 3, pp. 667-681.

(Continued)

*Primary Examiner* — Krystine Breier (57) ABSTRACT

A sensor assembly includes a housing structure, a seismic sensor in the housing structure to measure seismic waves propagated through a subterranean structure, and a pressure sensor in the housing structure. A processor in the housing structure is configured to receive a first signal based on an output of the seismic sensor, and a second signal based on an output of the pressure sensor. First and second digital filters are applied to the first and second signals. Application of the first and second digital filters to the first and second signals causes production of a substantially zero output in response to input that includes just noise data detected at the seismic sensor and the pressure sensor.

19 Claims, 5 Drawing Sheets

(56) References Cited

U.S. PATENT DOCUMENTS

| | | | |
|---|---|---|---|
| 4,706,226 | A | 11/1987 | Houghtaling |
| 4,890,264 | A | 12/1989 | Crews |
| 4,979,150 | A | 12/1990 | Barr |
| 4,996,675 | A | 2/1991 | Beauducel |
| 5,408,411 | A * | 4/1995 | Nakamura et al. ............... 701/48 |
| 5,555,530 | A | 9/1996 | Meehan |
| 5,621,699 | A | 4/1997 | Rigsby |
| 5,648,938 | A | 7/1997 | Jakubowicz |
| 6,002,640 | A * | 12/1999 | Harmon ......................... 367/38 |
| 6,201,764 | B1 * | 3/2001 | Rice et al. ....................... 367/21 |
| 6,381,544 | B1 | 4/2002 | Sallas |
| 6,442,304 | B1 | 8/2002 | Crawley |
| 6,446,009 | B1 | 9/2002 | Baeten |
| 6,512,980 | B1 | 1/2003 | Barr |
| 6,584,038 | B2 * | 6/2003 | Meunier ......................... 367/25 |
| 6,607,050 | B2 | 8/2003 | He et al. |
| 6,725,164 | B1 | 4/2004 | Bednar |
| 6,932,185 | B2 | 8/2005 | Bary |
| 6,961,283 | B2 | 11/2005 | Kappius |
| 7,082,079 | B2 | 7/2006 | Woo |
| 7,124,028 | B2 * | 10/2006 | Ray et al. .......................... 702/1 |
| 7,142,481 | B1 | 11/2006 | Metzbower |
| 7,319,641 | B2 | 1/2008 | Goudie et al. |
| 7,382,683 | B1 | 6/2008 | Ferber et al. |
| 7,551,517 | B2 | 6/2009 | Berg |
| 7,843,765 | B2 | 11/2010 | Kamata |
| 7,916,576 | B2 | 3/2011 | Beasley |
| 2006/0142946 | A1 | 6/2006 | Goujon et al. |
| 2009/0052277 | A1 | 2/2009 | Swanson |
| 2010/0100330 | A1 | 4/2010 | Burkholder |
| 2010/0302909 | A1 | 12/2010 | Muyzert et al. |
| 2011/0080808 | A1 | 4/2011 | Muyzert et al. |
| 2011/0082647 | A1 | 4/2011 | Edme et al. |
| 2011/0085417 | A1 | 4/2011 | Ronnow |
| 2011/0249530 | A1 | 10/2011 | Liu |

FOREIGN PATENT DOCUMENTS

| | | |
|---|---|---|
| FR | 2738642 A1 | 3/1997 |
| GB | 1256304 | 12/1971 |
| GB | 2456313 A | 7/2009 |
| WO | 2009087377 A1 | 7/2009 |

OTHER PUBLICATIONS

Barr, F.J., "Dual-Sensor OBC Technology," The Leading Edge, 1997, vol. 16, Issue 1, pp. 45-51.

Gulati, J.S., Stewart, R.R., Hoffe, B.H., "Vertical Hydrophone Cable Acquisition and Imaging on Land," Geophysics, 2001, vol. 66, No. 44, pp. 1190-1194.

Messaoud, M.A., Boulegroum, M.Z., Gribi, A., Touami, M., Anderson, B., Baaren, P.V., Eman, A.E., Rached, G., Laake, A., Pickering, S., Moldoveanu, N., and Ozbek, A., "New Dimensions in Land Seismic Technology," Oilfield Review, Oct. 1, 2005, vol. 17, Issue 3, Schlumberger.

Dalen, K.N., Van Drijkoningen, G.G., and Smeulders, D.M.J., Characterization of Subsurface Parameters with Combined Fluid-Pressure and Particle-Velocity Measurements, G035, Proceedings of the 70th Annual Conference of the European Association of Geoscientists and Engineers held in Rome, Italy, Jun. 15-20, 2008.

PCT Search Report, dated Apr. 28, 2011, Application No. PCT/US2010/051957.

Criss, Jason, Another Look at Full-Wave Seismic Imaging, First Break, vol. 25, Jun. 2007 (8 pages).

U.S. Appl. No. 12/720,188, Non-Final Rejection dated Aug. 27, 2012, pp. 1-3 and attachments.

* cited by examiner

SENSOR ASSEMBLY HAVING A SEISMIC SENSOR, PRESSURE SENSOR, AND PROCESSOR TO APPLY FIRST AND SECOND DIGITAL FILTERS

CROSS REFERENCE TO RELATED APPLICATIONS

This application claims the benefit under 35 U.S.C. §119 (e) of U.S. Provisional Application Ser. No. 61/250,666, entitled "Single Output Dual Sensor Unit For Surface Wave Attenuation," filed Oct. 12, 2009, which is hereby incorporated by reference.

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for receipt by seismic receivers (e.g., geophones, accelerometers, etc.). These seismic receivers produce signals that represent detected seismic waves. Signals from the seismic receivers are processed to yield information about the content and characteristic of the subterranean structure.

A typical land-based seismic survey arrangement includes deploying an array of seismic receivers on the ground with the seismic receivers provided in an approximate grid formation. The seismic receivers can be multi-component geophones that enable the measurement of an incoming wavefield in three orthogonal directions (vertical z, horizontal inline x, and horizontal crossline y).

For land-based seismic surveying, various types of unwanted wavefields may be present, including ground-roll noise, such as Rayleigh or Love surface waves. The unwanted wavefields can contaminate seismic data acquired by seismic receivers. Although various conventional techniques exist to remove unwanted wavefields from seismic data, such techniques are relatively complex and may be costly.

SUMMARY

In general, according to an embodiment, a sensor assembly includes a housing structure, a seismic sensor in the housing structure to measure seismic waves propagated through a subterranean structure, and a pressure sensor in the housing structure. A processor in the housing structure is configured to receive a first signal based on an output of the seismic sensor, and a second signal based on an output of the pressure sensor. First and second digital filters are applied to the first and second signals. Application of the first and second digital filters to the first and second signals causes production of a substantially zero output in response to input that includes just noise data detected at the seismic sensor and the pressure sensor.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to equipment and methods for use in certain orientations, such terms may refer to a left to right, right to left, or diagonal relationship as appropriate.

In accordance with some embodiments, to attenuate noise in seismic data in a land-based survey arrangement, sensor assemblies each having at least one seismic sensor and at least one pressure sensor are employed, where each sensor assembly further includes an integrated processor for applying digital filters to respective signals derived from outputs on the corresponding seismic sensor and pressure sensor.

The noise that is to be attenuated in the seismic data includes ground-roll noise. Ground-roll noise refers to seismic waves produced by seismic sources that travel generally horizontally along a ground surface towards seismic receivers. These horizontally traveling seismic waves, such as Rayleigh waves or Love waves, are undesirable components that can contaminate seismic data. Generally, "noise" refers to any signal component that is unwanted from seismic data (such as data representing reflected seismic signals from subterranean elements). Other types of noise include flexural waves present in data acquired over frozen surfaces such as a body of water or permafrost; or airborne noise caused by the environment such as due to wind, rain, or human activity such as traffic, air blasts, flare noise, or other industrial processes.

The digital filters include first and second digital filters that are applied to respective first and second signals derived from outputs of the seismic sensor and pressure sensor of each sensor assembly. In response to input that includes just noise detected by the seismic sensor and pressure sensor, the first and second digital filters are configured to cause production of a substantially zero output by the processor. "Substantially zero output" means that the output matches a reference (e.g., zero volts or some other reference voltage) to within some predefined tolerance, where the predefined tolerance is user-configurable (e.g. ±5%, ±10%, ±15%, etc.). Alternatively, the reference can be some non-level signature. Stated differently a substantially at zero output means that the output produced by the processor in response to the signals derived from outputs of the seismic sensor are at or close to the reference (to within some predefined tolerance, where the predefined tolerance is configurable by a user).

Figure 1:
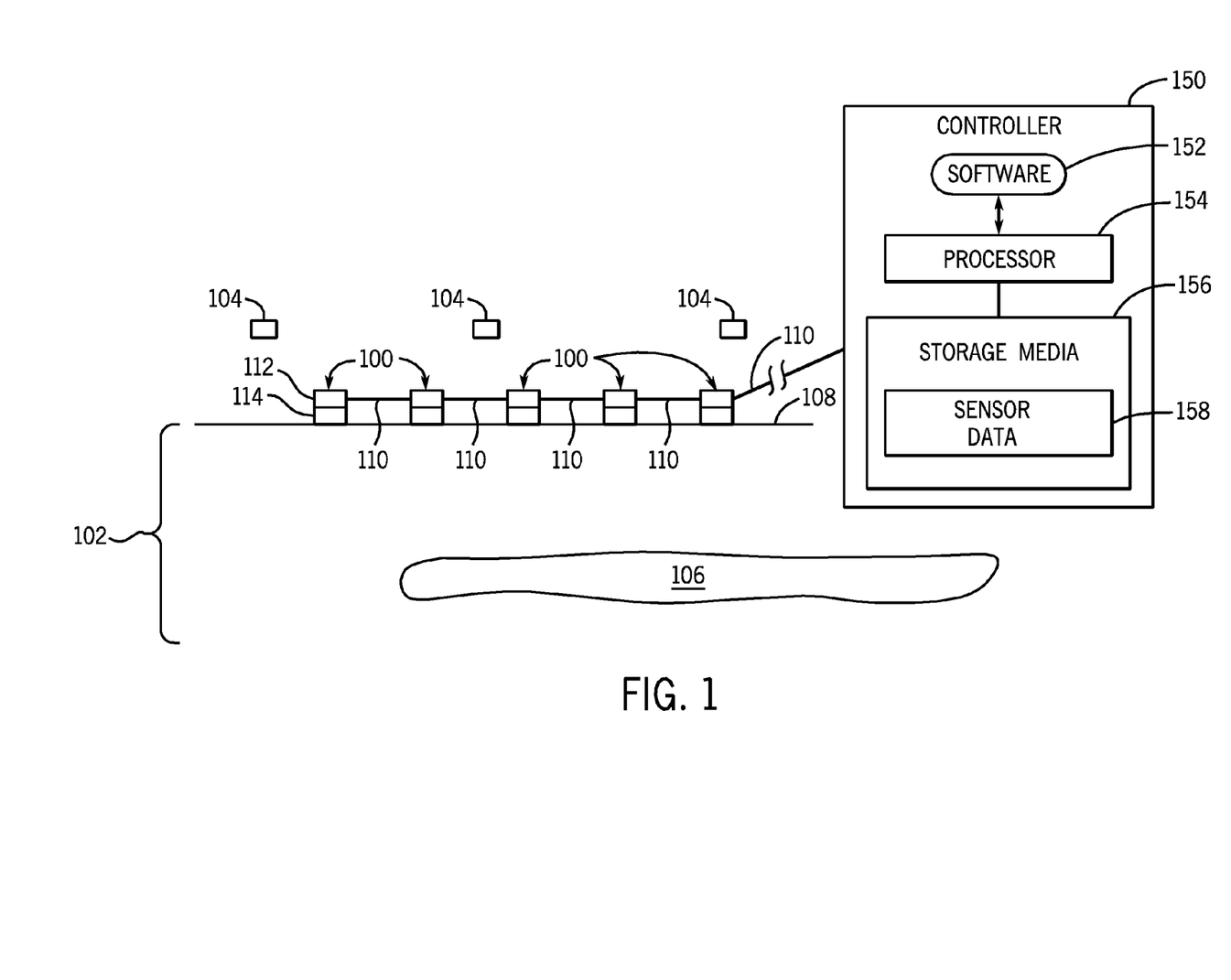
FIG. 1 is a schematic diagram of an example arrangement of sensor assemblies that can be deployed to perform a land-based seismic survey, according to an embodiment.

FIG. 1 is a schematic diagram of an arrangement of sensor assemblies 100 that are used for land-based seismic surveying. The sensor assemblies 100 are deployed on a ground surface 108 (in a row or in an array). A sensor assembly 100 being "on" a ground surface means that the sensor assembly 100 is either provided on and over the ground surface, or buried (fully or partially) underneath the ground surface such that the sensor assembly 100 is within 10 meters of the ground surface. The ground surface 108 is above a subterranean structure 102 that contains at least one subterranean element 106 of interest (e.g., hydrocarbon reservoir, freshwater aquifer, gas injection zone, etc.). One or more seismic sources 104, which can be vibrators, air guns, explosive devices, and so forth, are deployed in a survey field in which the sensor assemblies 100 are located.

Activation of the seismic sources 104 causes seismic waves to be propagated into the subterranean structure 102. Alternatively, instead of using controlled seismic sources as noted above to provide controlled source or active surveys, some embodiments can also be used in the context of passive surveys. Passive surveys use the sensor assemblies 100 to perform one or more of the following: (micro)earthquake monitoring; hydro-frac monitoring where microearthquakes are observed due to rock failure caused by fluids that are actively injected into the subsurface, such as a hydrocarbon reservoir; and so forth.

Seismic waves reflected from the subterranean structure 102 (and from the subterranean element 106 of interest) are propagated upwardly towards the sensor assemblies 100. Seismic sensors 112 (e.g., geophones, accelerometers, optical sensors, velocity sensors, motion sensors, etc.) in the corresponding sensor assemblies 100 measure the seismic waves reflected from the subterranean structure 102. Moreover, the sensor assemblies 100 further include divergence sensors (pressure sensors) 114 that are designed to measure noise, such as ground-roll noise or other types of noise.

In one embodiment, the sensor assemblies 100 are interconnected by an electrical cable 110 (or other type of communication medium) to a controller 150. Alternatively, instead of connecting the sensor assemblies 100 by the electrical cable 110, the sensor assemblies 100 can communicate wirelessly with the controller 150 (for cable-free sensor assemblies). In some implementations, intermediate routers or concentrators may be provided at intermediate points of the network of sensor assemblies 100 to enable communication between the sensor assemblies 100 and the controller 150. Another type of cable-free sensor assembly includes a sensor assembly that includes local storage to store measurement data—the stored measurement data can be later collected manually, such as by connecting another device to the sensor assembly.

The controller 150 shown in FIG. 1 further includes processing software 152 that is executable on a processor 154. The processor 154 is connected to storage media 156 (e.g., one or more disk-based storage devices and/or one or more memory devices).

The storage media 156 is used to store sensor data 158. The sensor data 158 includes output data produced by each of the sensor assemblies 100. In some embodiments, the processor within each sensor assembly 100 is configured to output a combined signal that is a combination of the filtered seismic sensor signal and filtered pressure sensor signal. Alternatively, the filtered seismic sensor signal and the filtered pressure sensor signal are outputted separately by the sensor assembly for recording in the storage media 156 of the controller 150.

In operation, the software 152 in the controller 150 is executable to process the sensor data 158 to produce an output to characterize the subterranean structure 102.

Figure 2:
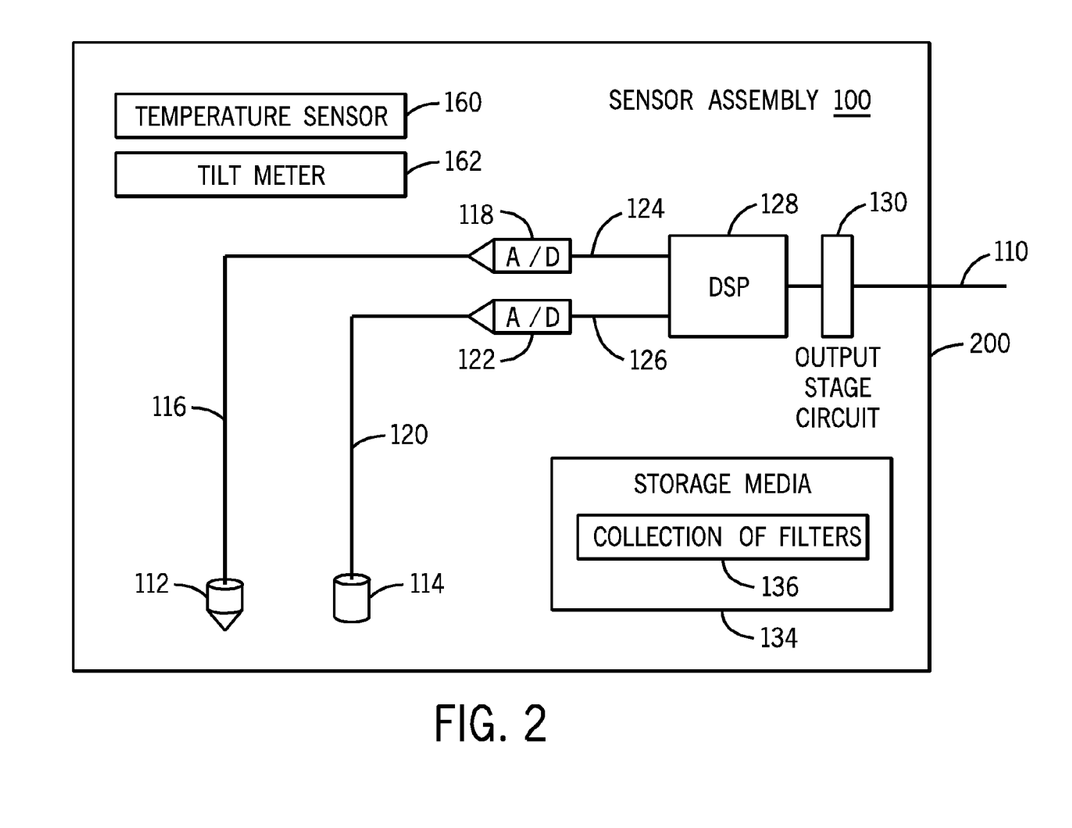
FIGS. 2 and 3 are block diagram of different embodiments of a sensor assembly.

FIG. 2 is a block diagram of an example sensor assembly 100, according to an embodiment. A housing structure 200 of the sensor assembly 100 contains various components, including the seismic sensor 112 and pressure sensor 114. Although just one seismic sensor 112 and pressure sensor 114 are depicted in FIG. 2, note that in different implementations multiple seismic sensor(s) and/or multiple pressure sensor(s) can be provided.

A "housing structure" can refer to a single housing, or to multiple housings. For example, in some implementations, the seismic sensor 112 and pressure sensor 114 are contained in separate housings that are part of the housing structure 200. Alternatively, in other implementations, the seismic sensor 112 and pressure sensor 114 are contained within the same housing. An output of the seismic sensor 112 is provided over a communications link 116 (which can be implemented with one or more electrically conductive wires, for example) to an analog-to-digital (A/D) converter 118. An output of the pressure sensor 114 is provided over a communications link 120 to an ND converter 122.

Each A/D converter 118 or 122 converts the respective analog output of the seismic sensor 112 or pressure sensor 114 into a respective digital signal that is provided over link 124 or link 126 to a processor 128 that is also within the housing structure 200 of the sensor assembly 100. In some implementations, the processor 128 is implemented with a digital signal processor (DSP). In other implementations, the processor 128 can be implemented with other types of devices, such as programmable gate arrays or integrated circuit devices.

The output of the DSP 128 is provided to an output stage circuit 130, which provides an output signal based on signals measured by the seismic sensor 112 and pressure sensor 114 over the electrical cable 110. The output stage circuit 130 can include one or more of the following: a buffer, an amplifier, or a conversion circuit. Note that the output signal is combined from the signals of both the seismic and pressure sensors 112 and 114. In this manner, by outputting a combined signal rather than two individual signals corresponding to the signals from the seismic and pressure sensors 112 and 114, a reduced amount of data has to be transmitted over communication medium (e.g., 110) to the controller 150.

In an alternative implementation, the DSP 128 is configurable to provide separate output signals corresponding to the signals from the seismic sensor 112 and pressure sensor 114, respectively.

The DSP 128 is able to apply corresponding digital filters to respective digital signals from the ND converters 118 and 122. Representations of the filters that are to be applied can be stored in a storage media 134 of the sensor assembly 100. In FIG. 2, such representations of filters are represented as a collection of filters 136 that are stored in the storage media 134. Although the storage media 134 is shown as being outside the DSP 128, note that the storage media 134 can actually be part of the DSP 128. Alternatively, the storage media 134 can be separate from the DSP 128.

Figure 3:
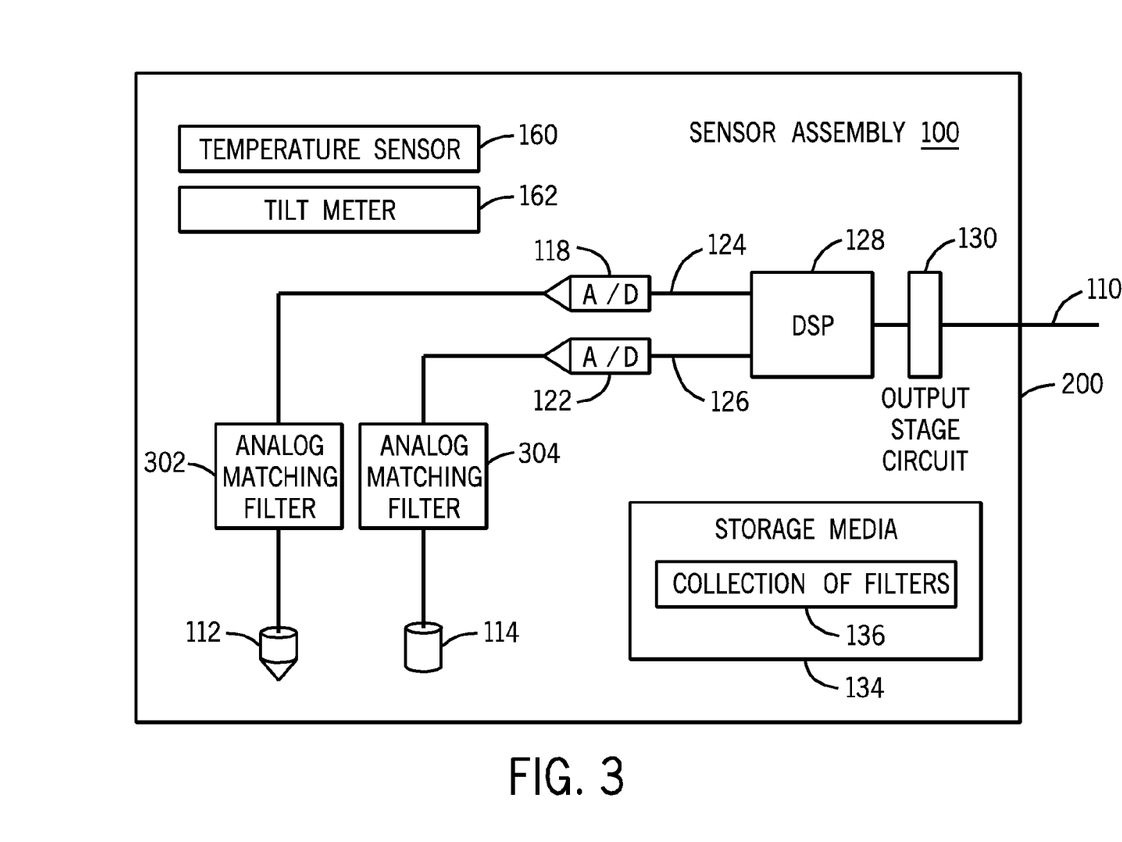

FIG. 3 shows an alternative embodiment of the sensor assembly 100. In FIG. 3, the components of the sensor assembly 100 are the same as the components shown in FIG. 2, except that analog matching filters 302 and 304 have been added. The analog matching filter 302 is provided between the seismic sensor 112 and the ND converter 118, while the analog matching filter 304 is provided between the pressure sensor 114 and the A/D converter 122.

The analog matching filters 302 and 304 provided at the outputs of seismic sensor 112 and pressure sensor 114, respectively, are designed to make the digital filters easier to implement or to enable the use of digital filters that require less memory and processing power. As examples, the analog and matching filters 302 and 304 can be low-pass filters or anti-aliasing filters. Alternatively, the analog matching filters 302 and 304 can include integrators and/or derivators.

An output signal, $s_{out}$, is formed by the DSP 128 from a first signal $s_g(n)$ derived from the output of the seismic sensor 112, and second signal $s_h(n)$ derived from the output of the pressure sensor 114, as follows:

$$s_{out}(n)=F_g[s_g(n)]+F_h[s_h(n)], \quad \text{(Eq. 1)}$$

where $F_g$ and $F_h$ are digital filters that are designed to cause production of a substantially zero output ($s_{out}(n)$) for the case that the sensor assembly 100 is excited by ground-roll waveforms (or other type of noise) only. The digital filters $F_g$ and $F_h$ are selected from the collection of filters 136 stored in the storage media 134 of FIG. 2 or FIG. 3.

Note that each of the signals $s_g$ and $s_h$ can be the sum or average of signals for more than one transducer element in each respective seismic sensor 112 or pressure sensor 114.

As further shown in FIG. 2 or 3, the sensor assembly 100 in some implementations can further include one or more of a temperature sensor 160 and a tilt meter 162. The temperature sensor 160 and/or tilt meter 162 is/are provided in the sensor assembly 100 to enable the digital filters $F_g$ and $F_h$ to be adjusted based on the detected temperature (of the environment of the sensor assembly 100) and/or detected tilt (of the sensor assembly 100 from an expected orientation). More specifically, the transfer function of each of the digital filters $F_g$ and $F_h$ can be adjusted based on detected temperature and/or tilt.

Also, note that the seismic sensor 112 and the pressure sensor 114 can be selectively activated or deactivated according to the needs of the field seismic operations. In some operations, both the seismic and pressure sensors 112 and 114 are activated in a sensor assembly 100. In other operations, just one of the seismic and pressure sensors 112 and 114 is activated in a sensor assembly 100. Selection of which of the seismic and pressure sensors 112 and 114 to activate can be based on setting a configurable parameter (or plural configurable parameters) in the DSP 128.

The digital filters $F_g$ and $F_h$ can be configured based on the transfer functions of the seismic sensor 112 and pressure sensor 114, respectively. The transfer functions of the seismic sensor 112 and pressure sensor 114 can be determined experimentally, with the determined transfer functions applied for all applications for easy of implementation.

Alternatively, the collection of filters 136 stored in the storage media 134 (as shown in FIG. 2 or 3) can include multiple filters from which $F_g$ and/or $F_h$ can be selected. Stated differently, the collection of filters 134 can include multiple candidate digital filters for $F_g$ and multiple candidate digital filters for $F_h$. Selection of a particular digital filter ($F_g$ or $F_h$) from multiple candidate digital filters can be based on one or more criteria, including the following: ground surface conditions (which refer to the speed/velocity of sound into the ground, which can differ based on whether the ground is frozen, whether the ground is made up of sand, etc.); temperature conditions (as detected by a temperature sensor such as temperature sensor 160); sensor assembly orientation (as detected by the tilt meter 162); type of seismic source; geometry of the planted sensor assemblies; and so forth. The filters can be selected individually for each of the sensor assemblies 100, or alternatively, the selection of the filters can be applied to all sensor assemblies in the spread. The coefficients of the digital filters $F_g$ and $F_h$ can be stored locally in the sensor assembly 100, or can be downloaded from the controller 150.

In another alternative embodiment, the digital filters can be identified dynamically. In other words, the digital filters can be determined from seismic signals recorded from the sensor assemblies planted at their actual positions in the spread. To perform the dynamic filter identification, the seismic sources are positioned in predetermined positions relative to the spread, and the signals are recorded from each seismic sensor 112 and pressure sensor 114. The parts of the recorded signals that are due to noise are selected as calibration signals, where different time windows are used for each pressure sensor/seismic sensor pair. Matching filters are then identified for each sensor assembly 100. The matching filters $F_g$ or $F_h$ are designed to minimize the power of $s_{out}(n)$ in Eq. 1 above, when the calibration signals are input to the respective filters. The matching digital filters designed in this manner can include also effects of coupling for each sensor assembly point.

Some benefits of some embodiments of the invention are set forth below. By providing a single output from each sensor assembly 100 in some embodiments, the amount of data that has to be communicated from the sensor assemblies 100 to the controller 150 is reduced, allowing for more data to be sent to the controller 166. Also, the number of sensor assemblies 100 can also be reduced, which reduces hardware costs as well as costs of deployment.

Figure 4:
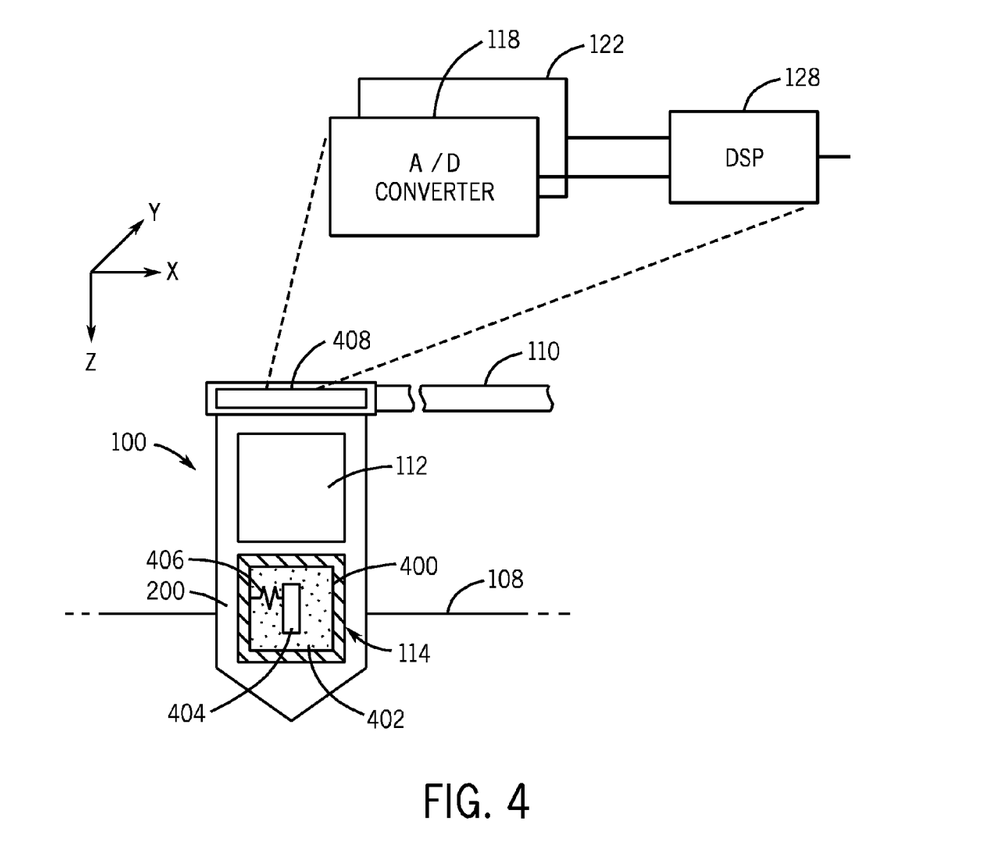
FIG. 4 is a schematic diagram of a sensor assembly according to some embodiments.

A sensor assembly 100 according to some embodiments is depicted in greater detail in FIG. 4. The seismic sensor 112 in the sensor assembly can be a geophone for measuring particle velocity induced by seismic waves in the subterranean structure 102, or alternatively, the seismic sensor 112 can be an accelerometer for measuring acceleration induced by seismic waves propagated through the subterranean structure 102. An accelerometer can be a geophone accelerometer or a MEMS (microelectromechanical system) accelerometer. In other implementations, other types of seismic sensors can be used, such as optical sensors, velocity sensors, or motion sensors. The motion sensor can be a three-axis MEMS sensor, where the vertical component can be calculated and used as $s_g$ in Eq. 1 above.

The pressure sensor 114 that is also part of the sensor assembly 100 (within the housing structure 200 of the sensor assembly 100) is used for measuring an input (e.g., noise) different from the seismic waves propagated through the subterranean structure 102 that are measured by the seismic sensor 112. In an alternative embodiment, the pressure sensor 114 of the sensor assembly 100 can be physically spaced apart from the seismic sensor 112 by some predetermined distance.

The pressure sensor 114 has a closed container 400 that is sealed. The container 400 contains a volume of liquid 402 (or other material such as a gel or a solid such as sand or plastic) inside the container 400. Moreover, the container 400 contains a hydrophone 404 (or other type of pressure sensing transducer) that is immersed in the liquid 402 (or other material). The pressure sensor being immersed in the material means that the pressure sensor is surrounded by or otherwise attached to or in contact with the material. In the ensuing discussion, reference is made to the hydrophone 404 that is immersed in the liquid 402—note that in alternative embodiments, other types of pressure sensing transducers can be immersed in other types of material. The hydrophone 404, which is neutrally buoyantly immersed in the liquid 402, is mechanically decoupled from the walls of the container 400. As a result, the hydrophone 404 is sensitive to just acoustic waves that are induced into the liquid 402 through the walls of the container 400. To maintain a fixed position, the hydrophone 404 is attached by a coupling mechanism 406 that dampens propagation of acoustic waves through the coupling mechanism 406.

In an alternative embodiment, instead of using the hydrophone 406 in the pressure sensor 114, a piezo-electric transducer element can be used instead.

Examples of the liquid 402 include the following: kerosene, mineral oil, vegetable oil, silicone oil, and water. In other embodiments, other types of liquids can be employed. A liquid with a higher viscosity can be used to change the sensitivity to different types of waves, including P (compression) waves, S (shear) waves, Rayleigh waves, and Love waves. Moreover, the amount of liquid 402 provided in the container 400 of the pressure sensor 114 determines the sensitivity of the hydrophone 404. A container 200 that is only partially filled with liquid records a weaker signal. In some embodiments, the container 400 can be partially filled with liquid to provide an expansion volume within the container 400. Expansion of the liquid 402, such as due to a temperature rise of the liquid 402, can be accommodated in the expansion volume (which can be filled with a gas).

As further shown in FIG. 4, the sensor assembly 100 also includes electronic circuitry 408 that is electrically coupled to both the seismic sensor 112 and the pressure sensor 114. The electronic circuitry 408 includes the components shown in FIG. 2 or 3, such as the ND converters 118, 122 and DSP 128. The electronic circuitry 408 is able to communicate the filtered data acquired by the seismic sensor 112 and pressure sensor 114 over the electrical cable 110 to the controller 150 (FIG. 1).

Figure 5:
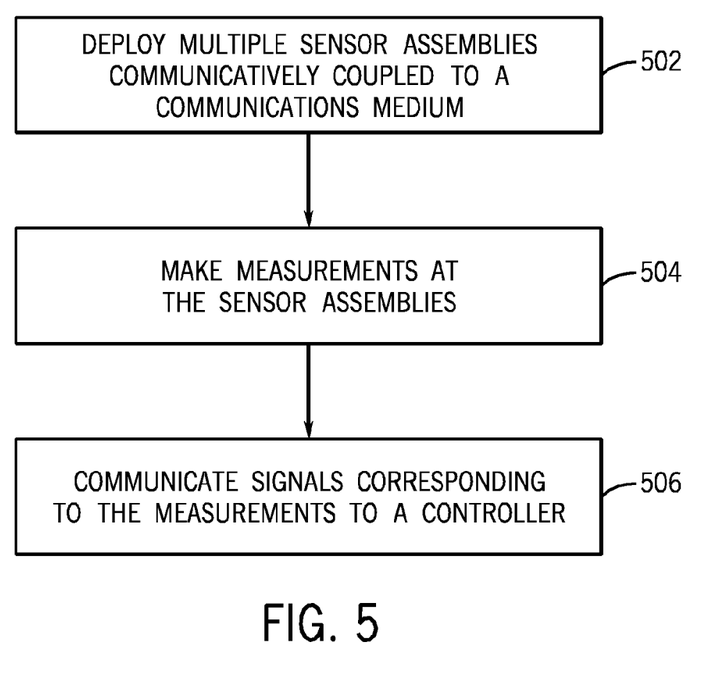
FIG. 5 is a flow diagram of a measurement process according to an embodiment.

FIG. 5 is a flow diagram of a process according to an embodiment. Multiple sensor assemblies 100 are deployed (at 502), such as in a row or in a two-dimensional array. The deployed sensor assemblies are communicatively coupled to a communications medium, such as cable 110 in FIG. 1.

Measurements are made (at 504) at the sensor assemblies 100 in response to a seismic stimuli. Signals corresponding to the measurements are then communicated (at 506) from the sensor assemblies 100 to the controller 150, for processing and/or recording.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A sensor assembly comprising:
a housing structure;
a seismic sensor in the housing structure to measure seismic waves propagated through a subterranean structure;
a pressure sensor in the housing structure;
a processor in the housing structure configured to:
receive a first signal based on an output of the seismic sensor, and a second signal based on an output of the pressure sensor;
apply a first digital filter to the first signal;
apply a second digital filter to the second signal,
wherein application of the first digital filter and second digital filter is to cause production of a substantially zero output by the processor in response to input that includes just noise data detected at the seismic sensor and the pressure sensor; and
a storage medium to store a collection of digital filters, wherein the processor is configured to select the first digital filter from among multiple digital filters in the collection, and to select the second digital filter from among multiple digital filters in the collection, and wherein selecting the first and second digital filters is according to one or more criteria.

2. The sensor assembly of claim 1, wherein the first signal is represented as $s_g$, the second signal is represented as $s_h$, the first digital filter is represented as $F_g$, and the second filter is represented as $F_h$, and wherein the processor is configured to produce an output signal $s_{out}=F_g[s_g]+F_h[s_h]$.

3. The sensor assembly of claim 2, wherein the processor is selected from the group consisting of a digital signal processor (DSP), a programmable gate array, and an integrated circuit device.

4. The sensor assembly of claim 1, further comprising:
a first analog-to-digital converter between the seismic sensor and the processor; and
a second analog-to-digital converter between the pressure sensor and the processor.

5. The sensor assembly of claim 1, wherein the housing structure includes separate housings for the seismic sensor and pressure sensor, respectively.

6. The sensor assembly of claim 1, wherein the seismic sensor is selected from the group consisting of a geophone, an accelerometer, an optical sensor, a velocity sensor, and a motion sensor.

7. The sensor assembly of claim 1, wherein the pressure sensor is selected from the group assembly of a hydrophone and a piezo-electric transducer.

8. The sensor assembly of claim 1, wherein the processor is configured to output a signal that is a combination of an output of the first digital filter and an output of the second digital filter, wherein the output signal is to be sent to a remote controller for recording.

9. The sensor assembly of claim 1, wherein the processor is configured to output plural signals corresponding to outputs of the first and second digital filters, wherein the plural output signals are to be sent to a remote controller for recording.

10. The sensor assembly of claim 1, further comprising a first analog matching filter connected to an output of the seismic sensor, and a second analog matching filter connected to an output of the pressure sensor, wherein the first and second matching filters are configured to produce outputs from which the first and second signals are respectively based.

11. The sensor assembly of claim 1, wherein the one or more criteria comprise one or more selected from the group consisting of a ground surface condition that affects a velocity of sound, an orientation of the sensor assembly as detected by a tilt meter, and a type of seismic source.

12. A system comprising:
a communications medium;
a plurality of sensor assemblies communicatively coupled to the communications medium, wherein at least one of the plurality of sensor assemblies comprises:
a housing structure;
a seismic sensor in the housing structure to measure seismic waves propagated through a subterranean structure;
a pressure sensor in the housing structure;
a processor in the housing structure configured to:
receive signals based on corresponding outputs of the seismic sensor and pressure sensor;
apply digital filters to respective ones of the signals;
wherein application of the digital filters is to cause production of a substantially zero output by the processor in response to input that includes just noise data detected at the seismic sensor and the pressure sensor; and a storage medium to store a collection of digital filters, wherein the processor is configured to select a first of the digital filters from among multiple digital filters in the collection, and to select a second of the digital filters from among multiple digital filters in the collection, wherein selecting the first and second digital filters is according to one or more criteria.

13. The system of claim 12, wherein the processor is configured to output a signal that is a combination of corresponding outputs of the digital filters, the system further comprising:
a controller configured to receive the output signal over the communications medium.

14. The system of claim 13, wherein a first of the received signals is represented as $s_g$, a second of the received signals is represented as $s_h$, a first of the digital filters is represented as $F_g$, and a second of the digital filters is represented as $F_h$, and wherein the processor is configured to produce the output signal $s_{out}=F_g[s_g]+F_h[s_h]$.

15. The system of claim 12,
wherein the processor is configured to apply the first digital filter to a first signal based on output of the seismic sensor, and to apply the second digital filter to a second signal based on output of the pressure sensor.

16. The system of claim 12, wherein the at least one sensor assembly further comprises a container within the housing structure, wherein the container contains a material, wherein the pressure sensor is immersed in the material, and wherein the material is selected from the group consisting of a liquid, a gel, and a solid.

17. A method comprising:
deploying a plurality of sensor assemblies communicatively coupled to a communications medium, wherein at least one of the plurality of sensor assemblies comprises:
a housing structure;
a seismic sensor in the housing structure to measure seismic waves propagated through a subterranean structure;
a pressure sensor in the housing structure; and
a processor in the housing structure configured to:
receive signals based on corresponding outputs of the seismic sensor and pressure sensor;
apply digital filters to respective ones of the signals;
wherein application of the digital filters is to cause production of a substantially zero output by the processor in response to input that includes just noise data detected at the seismic sensor and the pressure sensor;
providing, in a storage medium, a collection of digital filters, wherein the processor is configured to select the first digital filter from among multiple digital filters in the collection, and to select the second digital filter from among multiple digital filters in the collection, and wherein selecting the first and second digital filters is according to one or more criteria.

18. The system of claim 12, wherein the one or more criteria comprise one or more selected from the group consisting of a ground surface condition that affects a velocity of sound, an orientation of the at least one sensor assembly as detected by a tilt meter, and a type of seismic source.

19. The method of claim 17, wherein the one or more criteria comprise one or more selected from the group consisting of a ground surface condition that affects a velocity of sound, an orientation of the at least one sensor assembly as detected by a tilt meter, and a type of seismic source.

* * * * *